(12) United States Patent
Kohli

(10) Patent No.: US 11,361,390 B2
(45) Date of Patent: Jun. 14, 2022

(54) SCHEDULING A PAYMENT BASED ON A RECOMMENDED PAYMENT SCHEDULE FOR A BUSINESS ENTITY

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 125 days.

(21) Appl. No.: 16/590,870

(22) Filed: Oct. 2, 2019

(65) Prior Publication Data

US 2021/0103994 A1    Apr. 8, 2021

(51) Int. Cl.
*G06Q 40/00* (2012.01)
*G06Q 20/10* (2012.01)
*G06Q 30/04* (2012.01)

(52) U.S. Cl.
CPC ......... *G06Q 40/125* (2013.12); *G06Q 20/102* (2013.01); *G06Q 30/04* (2013.01)

(58) Field of Classification Search
CPC ..... G06Q 40/125; G06Q 20/102; G06Q 30/04
USPC .................................................. 705/30, 40
See application file for complete search history.

(56) References Cited

U.S. PATENT DOCUMENTS

| 8,249,983 | B2 | 8/2012 | Dilip et al. |
| 8,285,641 | B2* | 10/2012 | Cataline ................ G06Q 20/10 705/40 |
| 8,554,673 | B2 | 10/2013 | McRae et al. |
| 8,639,622 | B1* | 1/2014 | Moore ................... G06Q 20/00 705/43 |
| 8,732,073 | B2 | 5/2014 | Thomas |
| 2002/0198835 | A1 | 12/2002 | Watson |

(Continued)

OTHER PUBLICATIONS

Unknown, "Finance Essentials in Microsoft Dynamics® NAV 2013, Module 6: Receivables and Payables Management: Payment Discount and Payment Tolerance," Microsoft Official Training Materials for Microsoft Dynamics, Last Modified Thursday, Feb. 8, 2018, 58 pages.

*Primary Examiner* — Florian M Zeender
*Assistant Examiner* — Christopher R Buchanan

(57) ABSTRACT

The disclosure herein describes scheduling an automatic payment based on a recommended payment schedule that is generated based on a cashflow pattern. Cashflow data associated with a plurality of invoices is received, the cashflow data including data associated with past paid payments, past received payments, accounts receivable, and accounts payable. A cashflow pattern is determined based on the past paid payments and the past received payments. Then, a payment pattern associated with the accounts payable is generated based on the cashflow pattern and the accounts receivable, wherein the payment pattern indicates a pattern of payments that optimizes a net present value of funds associated with the set of accounts payable over an associated period. A recommended payment schedule based on the payment pattern is then provided via a user interface and, based on receiving input in response to the provided recommended payment schedule, at least one automatic payment is scheduled based on the payment pattern.

20 Claims, 6 Drawing Sheets

(56) References Cited

U.S. PATENT DOCUMENTS

| | | | |
|---|---|---|---|
| 2003/0220863 A1 | 11/2003 | Holm et al. | |
| 2004/0215560 A1* | 10/2004 | Amalraj | G06Q 20/102 |
| | | | 705/40 |
| 2004/0236660 A1* | 11/2004 | Thomas | G06Q 10/10 |
| | | | 705/37 |
| 2006/0149671 A1 | 7/2006 | Nix et al. | |
| 2007/0162387 A1 | 7/2007 | Cataline et al. | |
| 2013/0204728 A1 | 8/2013 | Lichterman et al. | |
| 2015/0142643 A1* | 5/2015 | Ceribelli | G06Q 30/04 |
| | | | 705/39 |
| 2015/0379486 A1 | 12/2015 | Verde | |
| 2020/0193437 A1* | 6/2020 | Robinson | G06Q 20/405 |

* cited by examiner

SCHEDULING A PAYMENT BASED ON A RECOMMENDED PAYMENT SCHEDULE FOR A BUSINESS ENTITY

BACKGROUND

Many modern businesses must manage a complex array of incoming payments from many different customers, which may also be businesses in their own right, and outgoing payments to other businesses in exchange for goods, materials, and/or services rendered as a part of day-to-day business operations. Such payments and other transactions may be defined through the use of invoices or other similar agreement documents, but due to the sheer quantity of outstanding transactions with different entities, manual tracking and scheduling of payments presents a significant administrative challenge. Further, some transaction agreements include optional features, such as discounts for early payment, which present valuable opportunities if leveraged by the business, but also serve to add to the complexity of effectively scheduling all of the payments of a business.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for scheduling an automatic payment based on a recommended payment schedule that is generated based on a cashflow pattern is described. Cashflow data associated with a plurality of invoices is received, the cashflow data including data associated with a plurality of past paid payments, a plurality of past received payments, a set of accounts receivable, and a set of accounts payable. A cashflow pattern is determined based on the cashflow data associated with the plurality of past paid payments and the plurality of past received payments. Then, a payment pattern associated with the set of accounts payable is generated based on the cashflow pattern and the set of accounts receivable, wherein the payment pattern indicates a pattern of payments that optimizes a net present value of funds associated with the set of accounts payable over an associated period. A recommended payment schedule based on the payment pattern is then provided via a user interface and, based on receiving input in response to the provided recommended payment schedule, at least one automatic payment is scheduled based on the payment pattern.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for scheduling an automatic payment based on a recommended payment schedule that is generated based on a cashflow pattern. Cashflow data of a plurality of invoices is received. The cashflow data includes data associated with past paid payments, past received payments, a set of accounts receivable, and a set of accounts payable. A cashflow pattern is determined based on the cashflow data of the past paid payments and the past received payments. Then, a payment pattern associated with the set of accounts payable is generated based on the cashflow pattern and the set of accounts receivable. The generated payment pattern indicates a pattern of payments that optimizes a net present value of funds associated with the set of accounts payable over an associated period. A recommended payment schedule based on the payment pattern is then provided via a user interface and, based on receiving input in response to the provided recommended payment schedule, at least one automatic payment is scheduled based on the payment pattern.

The disclosure operates in an unconventional way to recommend a payment schedule and schedule payments based on the recommended schedule by automatically analyzing the cashflow data of a business, generating a payment schedule based on the data to optimize the use of the business' available funds throughout the period of the generated schedule, and automatically scheduling payments to be paid based on the generated schedule. Further, the described method and system collects feedback from users and cashflow events associated with businesses and adjusts the payment schedule generation techniques used to improve the accuracy and/or effectiveness of future payment schedule generation. The use of the described system simplifies the requirements of inputting invoice data into the system and substantially reduces the amount of time and effort required by users to determine effective payment scheduling in large and/or complex businesses. Additionally, by automatically scheduling some or all of the payments of a generated payment schedule, the system reduces the number of necessary manual interactions from users to ensure that the payments are paid.

Figure 1:
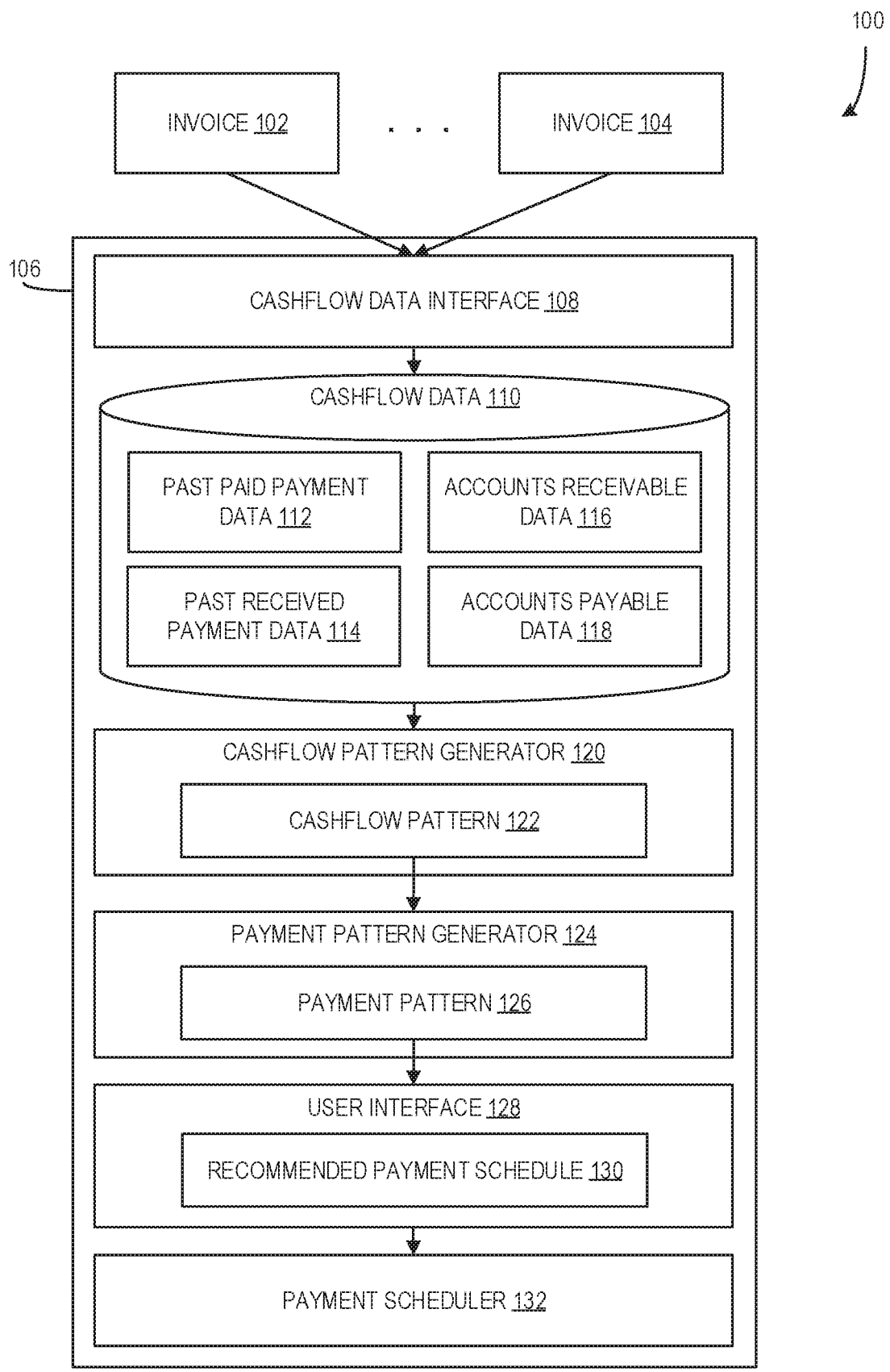
FIG. 1 is a block diagram illustrating a system configured for managing business payments based on cashflow data according to an embodiment.

FIG. 1 is an exemplary block diagram illustrating a system 100 configured for managing business payments based on cashflow data 110 according to an embodiment. The system 100 includes a plurality of invoices 102-104 that are provided to a payment manager 106 via a cashflow data interface 108. The payment manager 106 is configured to store the cashflow data 110 of the invoices 102-104 and use it to perform the payment management operations described herein. The payment manager 106 is further configured to include a cashflow pattern generator 120 for generating a cashflow pattern 122, a payment pattern generator 1240 for generating a payment pattern 126, a user interface 128, and a payment scheduler 132. It should be understood that the payment manager 106 includes hardware, firmware, and/or software of one or more computer devices that is configured to perform the operations described herein. Further, in some examples, the payment manager 106 is configured to perform the operations described herein for a plurality of different companies, parties to payments, or other such entities, such that payments from each of the plurality of different entities are managed as described herein. Alternatively, the payment manager 106 may be accessible by and configured for use by a single entity for managing payments by the single entity to other parties to the payments that are described in the invoices 102-104. Other organizations and/or distributions of the payment manager 106 and/or components or modules therein may be used without departing from the description herein. For instance, in some examples, the cashflow data 110 may be stored in a cloud-based or distributed data store that is accessible by client devices of multiple entities. The cashflow pattern generator 120 and/or payment pattern generator 124 may be part of the cloud-based portion of the system or they may be part of client device components or modules, with each entity having access to separate generator components. Information about the payment management operations may be provided to users via the user interface 128 of each client device over network connections. In such a distributed arrangement, the functionality described herein may be provided to companies or other entities as a service by a payment network or other facilitating entity.

The invoices 102-104 may include documents and/or files that describe business-to-business (B2B) transactions between two companies or other entities, including specific details or aspects of those transactions, such as due dates, descriptions of services or goods provided, description of payments to be made, discounts for early performance of services or early payments made, consequences for late payment or performance, any fees that may be involved, etc. While the term "invoice" is used, it should be understood that invoices 102-104 may include invoices, contracts, receipts, agreements, or any other documents or files that include information for defining an associated transaction between two parties.

The cashflow data interface 108 of the payment manager 106 includes hardware, firmware, and/or software configured to collect or otherwise obtain cashflow data from the invoices 102-104 and provide that cashflow data for storage in the payment manager 106 as cashflow data 110. In some examples, the cashflow data interface 108 is configured to read and/or analyze electronic invoice files to identify details of transactions with which the invoice files are associated. The identified details are then formatted into a consistent cashflow data format and stored as cashflow data 110. The cashflow data interface 108 may be configured to interpret the electronic invoice files based on identifying keywords, patterns of characters, or the like. For instance, dates associated with the transaction may be identified based on identifying the word "date" or other similar words, identifying portions of the invoice file that have commonly known date formatting (e.g., 02/20/2018, Feb. $20^{th}$, 2018, 2018-02-20, etc.). Parties to transactions may be identified through identifying words or phrases that match a dictionary of known entities. Alternatively, if one or more parties to the transaction do not match such a dictionary, common patterns or formats may be identified and used to determine portions of the invoice that indicate transaction parties.

In some examples, the cashflow data interface 108 is configured to accept invoices 102-104 that are specifically formatted for use with the cashflow data interface 108. In this case, the interface 108 identifies details of the transaction based on how information is arranged within the formatted invoices. For instance, the invoice format may include sections for selling party, buying party, sale amount, product or service description, payment due date, discount to be applied, etc. such that, when the interface 108 reads a section associated with a particular transaction detail, the information read may be recorded as being associated with the transaction detail with high confidence.

Alternatively, or additionally, the cashflow data interface 108 may be configured to attempt to identify all the details of a transaction from a provided invoice automatically and then provide the results of the identification process to a user via a user interface (e.g., user interface 128) for review and/or correction. If the cashflow data interface 108 is attempting to interpret invoices of different formats, some incorrect interpretations may occur (e.g., identifying a discount amount value as a total sale value) which may require user input to correct.

In further examples, the cashflow data interface 108 includes an interface for reading physical invoice documents via optical scanning technology or the like. In this case, the cashflow data interface 108 is configured to identify transaction details through pattern recognition applied to the data obtained when scanning the physical documents. Once scanned, optical character recognition (OCR) techniques may be used to interpret the scanned documents and obtain the cashflow data therefrom, as would be understood by a person of ordinary skill in the art.

Once the cashflow data interface 108 obtains data from the invoices 102-104, the payment manager 106 is configured to store the data as cashflow data 110. The cashflow data 110 includes past paid payment data 112 (payments previously made by an entity), past received payment data 114 (payments previously received by the entity), accounts receivable data 116 (payments that the entity expects to receive in the future based on the invoices 102-104), and accounts payable data (payments that the entity owes in the future based on the invoices 102-104). The data associated with past payments includes data values indicating amounts paid, dates paid, and parties to the transactions, as well as other data values that may be associated with the transactions. The data associated with payments to be received or to be paid includes data values indicating amounts to be paid, due dates of payments, early payment discounts, late payment fees or charges, parties to the transactions, and the like. The cashflow data 110 is described in greater detail below.

The cashflow pattern generator 120 includes hardware, firmware, and/or software configured to generate a cashflow pattern 122 from the cashflow data 110 as described herein. The generated cashflow pattern 122 includes predicted and/or estimated cashflow events, such as payments received or paid, over a period of time beginning at the present. The cashflow events are determined by the cashflow pattern generator 120 based at least on the past paid payment data 112 and the past received payment data 114. The accounts receivable data 116 may also be used in determining the cashflow pattern 122, as it includes information regarding payments that are expected to be received. In many cases, companies or other entities that may use the system 100 have scheduled transactions with other parties, transactions that occur at regular intervals, or the like. In some examples, the cashflow pattern generator 120 is configured to analyze the past payments paid and received by an entity to identify such regular interval payments, scheduled payments, or other such patterns. For instance, a first company that is using the system 100 has an agreement with a second company to provide a service for the second company in exchange for a monthly payment of $10,000. The past received payment data 114 includes monthly payments received by the first company from the second company. The data may indicate that the payments always occur on the same day of the month (e.g., $1^{st}$ of the month). Alternatively, the data may indicate that the monthly payments occur regularly but the specific day varies slightly month to month (e.g., payments are received mostly on the $1^{st}$ of the month, but sometimes on the $2^{nd}$ or $3^{rd}$ of the month). The cashflow pattern generator 120 is configured to identify such a pattern and include it in the generated cashflow pattern 122. In the cashflow pattern 122, the recurring payment described above may be indicated as a $10,000 cash increase that occurs with a high likelihood on the $1^{st}$ of the month with a small chance that it will be delayed to the $2^{nd}$ or $3^{rd}$ of the month (e.g., a 90% chance of a $10,000 cash increase on the $1^{st}$ of the month, 7% chance on the $2^{nd}$ of the month, and a 2% chance on the $3^{rd}$ of the month, with an additional 1% chance that the payment comes later or not at all for some reason).

In some examples, the past payment data of a company may include many such patterns with other parties, and the cashflow pattern generator 120 is configured to include all of them in the generated cashflow pattern 122. Once generated, the cashflow pattern 122 is configured to indicate possible cashflow events for the company over a period of time and the likelihood of those changes occurring at particular times during that period of time. As a result, the cashflow pattern 122 may further indicate a likely available funds value for a particular time during the period of time based on the predicted cashflow events. As an example, on the $10^{th}$ day of the time period associated with the cashflow pattern 122, the pattern 122 indicates that the available funds value held by the company is likely to be $40,000, as the current available funds value held by the company is $50,000 and the pattern 122 indicates the company is likely to receive at $10,000 payment on the $2^{nd}$ day of the time period and likely to make a payment of $20,000 on the $5^{th}$ day of the time period. Such values indicated by the pattern 122 may also be associated with a percentage value or confidence value that indicates the strength of the prediction and/or estimation based on the analysis of each possible cashflow event.

The payment pattern generator 124 includes hardware, firmware, and/or software configured to generate a payment pattern 126 based on the cashflow pattern 122 and/or other cashflow data 110 as described herein. The payment pattern 126 includes payment data indicating dates of payments, amounts to be paid, and parties to be paid during the time period of the cashflow pattern 122. In some examples, the indicated payments of the payment pattern 126 are optimized to reduce or minimize costs of the company over the time period, to increase or maximize a net present value of funds held by the company over the time period, and/or other factors. The payment pattern generator 124 is configured to use the cashflow pattern 122, including the likely available funds values at various points during the time period, and the accounts payable data 118 to optimize the payments to be made. The accounts payable data 118 indicates, at least, the amounts that are to be paid over the time period, the parties to which those payments are to be made, and the dates on which those amounts are to be paid. Further, the accounts payable data 118 may include discounts for early payment (e.g., a "Net 2/30" term in an invoice indicating a 2% discount for paying the payment prior to a 30-day due date) and/or similar charges or fees for late or delayed payment. Any other type of fee, charge, or discount may be included in the accounts payable data 118 and accounted for by the payment pattern generator 124 without departing from the description herein. Other exemplary aspects of generating payment patterns are described in greater detail below.

The user interface 128 includes hardware, firmware, and/or software configured to display or otherwise provide a recommended payment schedule 130 to a user of the system 100 as described herein. Further, the user interface 128 may be configured to accept or receive user input from the user in response to providing the recommended schedule 130 and/or input associated with control of or interaction with other components or modules of the system 100 (e.g., providing feedback with respect to cashflow data 110 that has been automatically extracted from invoices 102-104 as described above). It should be understood that the user interface 128 may include one or more interface components for providing output to users (e.g., display screens, speakers, touchscreens, or other user output interfaces known in the art) and/or one or more interface components for receiving input from users (e.g., touchscreens, keyboards, mouse devices, microphones, or other user input interfaces known in the art) without departing from the description herein.

The recommended payment schedule 130 includes a schedule of payments based on the generated payment pattern 126 and is provided to a user via the user interface 128. In some examples, the recommended payment schedule 130 is displayed in a graphical user interface (GUI) on a display screen or touchscreen of the user interface 128. The user interface 128 may be configured to enable a user to view the entire schedule 130 or portions of the schedule 130, enable the user to view the schedule 130 in different graphical arrangements or formats, and/or enable the user to edit, change, accept, reject, or otherwise interact with the recommended payment schedule 130 via the user interface 128. For instance, the recommended payment schedule 130 may list a set of payments that may be scheduled over the next month and a user viewing the schedule 130 may be enabled to accept individual payments as listed, reject individual payments as listed, move payments to other dates of the schedule, and/or change amounts to be paid for individual payments. Additionally, the user may be provided with buttons or other interface elements configured to accept or reject the entire recommended payment schedule 130 in its current state.

In some examples, the recommended payment schedule 130 provided to a user via the user interface 128 is configured to provide status information and/or alerts to the user based on the cashflow pattern 122, payment pattern 126, and/or other details of the cashflow data 110. For instance, the recommended payment schedule 130 may be configured to provide an available funds alert based on the predicted available funds value falling below a defined available fund threshold (e.g., the available funds value becomes a value that is less than the available fund threshold) and/or when available funds reflect a net deficit during the period of the cashflow pattern 122, payment pattern 126, and/or recommended payment schedule 130. Such an alert may include information regarding when the threshold is predicted to be crossed by the available funds, which payment results in the threshold being crossed, how long the available funds are predicted to be below the threshold, and other similar information. Further, the alert may include one or more recommendations for changes a user may select in the recommended payment schedule to avoid or minimize the available funds falling below the threshold. Other alerts or status information may also be provided in the recommended payment schedule 130 without departing from the description herein (e.g., alerts of payment due dates that will be missed during the schedule, expiration dates of agreements with other parties based on the invoices 102-104, confidence levels of portions of the payment schedule 130 based on the associated cashflow pattern 122, etc.).

The payment scheduler 132 includes hardware, firmware, and/or software configured for automatically scheduling payments from the recommended payment schedule 130 and/or the payment pattern 126. In some examples, the payment scheduler 132 receives instructions from the user interface 128 based on the recommended payment schedule 130 as to which payments to automatically schedule. For instance, a user may accept the recommended payment schedule 130 in its entirety, resulting in instructions being sent to the payment scheduler 132 to schedule all of the payments in the payment schedule 130 to be paid automatically at the times described in the schedule 130. Alternatively, or additionally, the user may have accepted some payments of the schedule 130 while rejecting others. In this case, the payment scheduler 132 is configured to only schedule the payments that are accepted for automatic payment, while the rejected payments are not scheduled by the payment scheduler 132.

In further examples, the payment scheduler 132 is configured to communicate and/or interact with electronic payment infrastructure that enables the system 100 to perform scheduled payments electronically with little or no required action by users of the system. For instance, the payment scheduler 132 may communicate with issuers, acquirers, other entities associated with accounts of the payer and/or payee of a payment, payment networks, or other payment facilitation entities to perform an electronic payment from the payer to the payee in a manner that would be understood by a person of ordinary skill in the art.

In some examples, payments from the recommended payment schedule that are rejected by a user may cause the system and/or user to be prompted regarding the rejected payments. While rejection of a payment may indicate that the user found it to be improperly scheduled, the payment may still be expected by the other entity based on the associated accounts receivable data. If that is the case, the system may be configured to generate a new payment pattern 126 that accounts for the rejected payments specifically. In some examples, the generation of a payment pattern based rejected payments includes generating a payment pattern that includes the rejected payments scheduled differently from the schedule in which they were originally rejected. Such a payment pattern may be generated to include payments that have been optimized as much as possible while still accounting for the limitations associated with avoiding the rejected payment pattern.

Alternatively, or additionally, rejected payments may have been rejected by the user to indicate that the payment need not or should not be paid for some reason. In this case, the user may be enabled to indicate this fact when provided with the recommended payment schedule (e.g., a "cancel payment" button or switch). Payments that have been rejected as being cancelled are not rescheduled by the payment manager 106 as described above, and instead, the cashflow data 110 associated with those payment may be updated to reflect the cancellation (e.g., the payment may be removed from accounts payable data 118, past recurring payments associated with the cancelled payment in the past paid payment data 112 may be ignored when generating a cashflow pattern 122, etc.).

It should be understood that, while many of the described examples herein focus on use of the payment manager 106 from the point of view of a single entity, the payment manager 106 may collect cashflow data associated with multiple companies, parties, or other entities and then perform the payment recommendation operations described herein separately for each of the multiple entities, including determining entity-specific cashflow patterns, generating entity-specific payment patterns, and providing entity specific recommended payment schedules to users via user interfaces that are associated with each separate entity (e.g., a user at a first company is provided a recommended payment schedule that includes recommended payments for the first company, but that user is not provided recommended payments from other entities).

Figure 2:
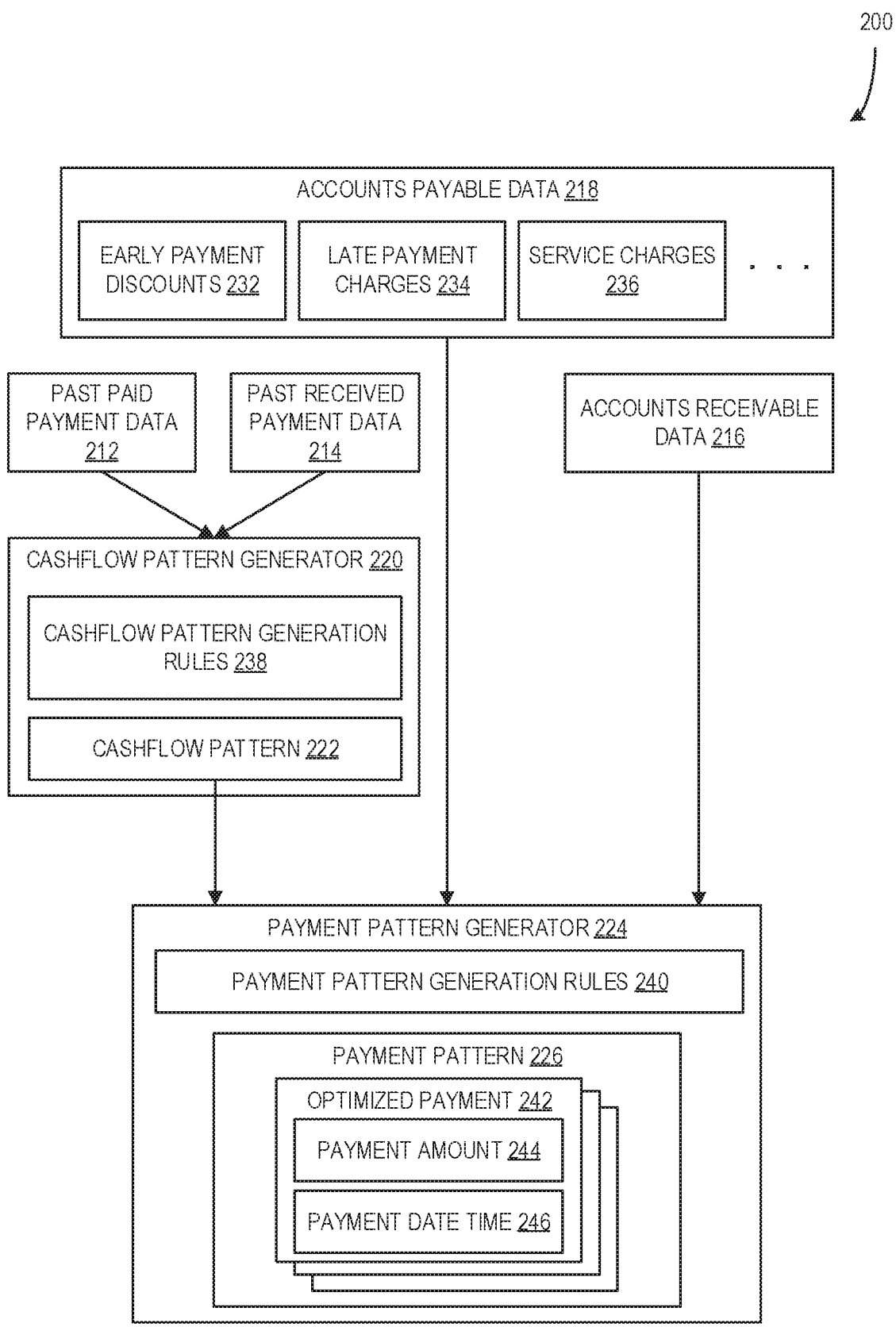
FIG. 2 is a block diagram illustrating a system configured for generating cashflow patterns and payment patterns to enable the management of business payments according to an embodiment.

FIG. 2 is an exemplary block diagram illustrating a system 200 configured for generating cashflow patterns 222 and payment patterns 226 to enable the management of business payments according to an embodiment. It should be understood that the system 200 may further include other components, such as those described above with respect to system 100 of FIG. 1, without departing from the description herein. As described above, the system 200 includes cashflow data including past paid payment data 212, past received payment data 214, accounts receivable data 216, and accounts payable data 218. The accounts payable data 218 further includes early payment discounts 232, late payment charges 234, and service charges 236. Other details that affect the payments associated with the current accounts payable may also be included in the accounts payable data 218 and used during payment pattern generation without departing from the description herein. For instance, the system 200 may use exchange rates of currency that may affect international payments, interest rates on short-term business loans that may be available for making payments, and/or return or interest rates made with respect to funds that are held but might otherwise be used to make payments, etc.

The cashflow pattern generator 220 is configured to generate a cashflow pattern 222 based on the past paid payment data 212 and the past received payment data 214 in a substantially similar manner as described above with respect to the cashflow pattern generator 120 of FIG. 1. Further, the cashflow pattern generator 220 includes cashflow pattern generation rules 238 that are configured to define how the cashflow pattern 222 is generated. The generation rules 238 define how various data values from the past payment data 212-214 are combined and/or used in the generation of the cashflow pattern 222. For instance, a cashflow pattern generation rule 238 may be defined to assign varying weights to each payment in a particular set of payments to or from an entity when determining a likely amount and/or time of a payment to or from the entity in the generated cashflow pattern 222. For instance, the weights assigned to each payment in the past payment data 212-214 associated with the entity may be varied based on recency of the payment (e.g., weights of payments may decrease from more recent payments to less recent payments). In further examples, cashflow pattern generation rules 238 are configured to determine confidence or likelihood values for each cashflow event in the generated cashflow pattern 222. A confidence value of a particular cashflow event is assigned to the event based on the number and/or consistency of associated payments in the past payment data 212-214 (e.g., a cashflow event of the cashflow pattern 222 that is determined based on only three associated payments in the past payment data 212-214 may have a lesser confidence value than a cashflow event that is determined based on 20 associated payments in the past payment data 212-214). Such confidence values may be of use to the payment pattern generator 224 when generating the payment pattern 226.

In some examples, the cashflow pattern generator 220 is configured to store a generated cashflow pattern 222 and compare it for accuracy against cashflow data collected later. For instance, the generated cashflow pattern 222 may be associated with a period of March and April of 2019 and, as actual cashflow data is collected through March and April of 2019, the generated cashflow pattern 222 is compared against it. Such comparisons may be used by the cashflow pattern generator 220 as feedback to adjust the cashflow pattern generation rules 238 to increase the accuracy of future generated cashflow patterns. For instance, if a payment amount predicted in the cashflow pattern 222 is significantly different from the payment amount of the actual payment that later occurs, a cashflow pattern generation rule 238 that is defined to apply weights to past payment amounts may be adjusted to increase the weight applied to the most recent past payment amounts relative to less recent past payment amounts. Other types of rule adjustments may be made in response to other types of feedback without departing from the description herein.

The payment pattern generator 224 is configured to generate a payment pattern 226 based on the cashflow pattern 222, accounts payable data 218, and the accounts receivable data 216 in a substantially similar manner as described above with respect to the cashflow pattern generator 124 of FIG. 1. Further, as with the cashflow pattern generator 220 above, the payment pattern generator 224 is configured to use payment pattern generation rules 240 to generate the payment pattern 226, which is generated to include a plurality of optimized payments 242, each optimized payment 242 having a payment amount 244 and a payment date time 246. The payment pattern generation rules 240 are configured for use in combining the data of the cashflow pattern 222 (e.g., predicted or estimated payments to be paid or received and associated confidence levels), the accounts receivable data 216, and the accounts payable data 218. For instance, payment pattern generation rules 240 may be defined for applying weights or priority factors to future payments of the accounts payable data 218 based on the parties associated with the payments, the value of any early payment discounts 232, the value of any late payment charges 234, the value of any service charges 236, etc. such that higher priority payments are scheduled before lower priority payments in situations where available funds dictate only one payment may be made at a particular time. For instance, a first payment to a first company that includes a 5% early payment discount if paid within 2 weeks may receive a higher weight or priority factor than a second payment to a second company that includes a 2% early payment discount if paid within the same 2 weeks, such that the first payment is scheduled during the 2-week early payment discount period before or instead of the second payment. However, if the second payment is for $10,000, resulting in a discount of $200 for early payment, and the first payment is for $2,000, resulting in a discount of $100 for early payment, the second payment may be assigned a higher priority factor.

In further examples, the rules 240 are configured to account for deadlines for payments to be made in comparison with incoming payments as determined based on the cashflow pattern 222 and/or accounts receivable data 216.

For instance, if an outgoing payment of $10,000 has a deadline on a Friday and an incoming payment of $12,000 is predicted on the Wednesday before the deadline of the outgoing payment, the rules 240 may be configured to identify a time period from Thursday through Friday for payment of the outgoing payment. However, if there is a discount for paying the outgoing payment by the Tuesday before the deadline, the rules 240 may indicate that the outgoing payment be made by Tuesday if the cashflow pattern 222 and/or other cashflow data indicate that sufficient funds will be available prior to the incoming payment. Still further rules 240 may account for interest or return value of cash on hand for a time period prior to it being paid (e.g., in a company bank account that yields a defined amount of interest or otherwise invested) and weigh that value against any discounts or other value gained by making payments earlier than due dates.

In some examples, the payment pattern generator 224 is configured to store a generated payment pattern 226 and compare it for accuracy against user feedback collected later. For instance, the generated payment pattern 226 may include a pattern of 30 optimized payments 242 to be made over the next three months and, when the pattern is provided to a user in the form of a recommended payment schedule as described herein, the user approves 25 optimized payments, adjusts the timing of 3 optimized payments, and rejects 2 payments. In such examples, the payment pattern generator 224 is configured to use the user feedback to adjust the payment pattern generation rules 240 to attempt to increase the accuracy of future generated payment patterns. In the above example, the payment pattern generator 224 analyzes the three adjusted payments and adjusts one or more of the payment pattern generation rules 240 to be more likely to arrive at the adjusted payment timings in future situations. Further, the payment pattern generator 224 may analyze the two rejected payments and/or the 25 approved payments to determine if adjustments to the payment pattern generation rules 240 are indicated. Other types of rule adjustments may be made in response to other types of feedback without departing from the description herein.

It should be understood that adjustment of the cashflow pattern generation rules 238 and/or the payment pattern generation rules 240 may be performed using any machine learning techniques. In some examples, the cashflow pattern generator 220 and/or the payment pattern generator 224 include machine learning modules that comprise trained regressors such as random decision forests, directed acyclic graphs, support vector machines, neural networks, or other trained regressors. Such a trained regressor may be trained using the feedback data described above. Examples of trained regressors include a convolutional neural network and a random decision forest. It should further be understood that the machine learning module, in some examples, may operate according to machine learning principles and/or techniques known in the art without departing from the systems and/or methods described herein.

In an example, the machine learning modules of the generators 220 and/or 224 may make use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

Figure 3:
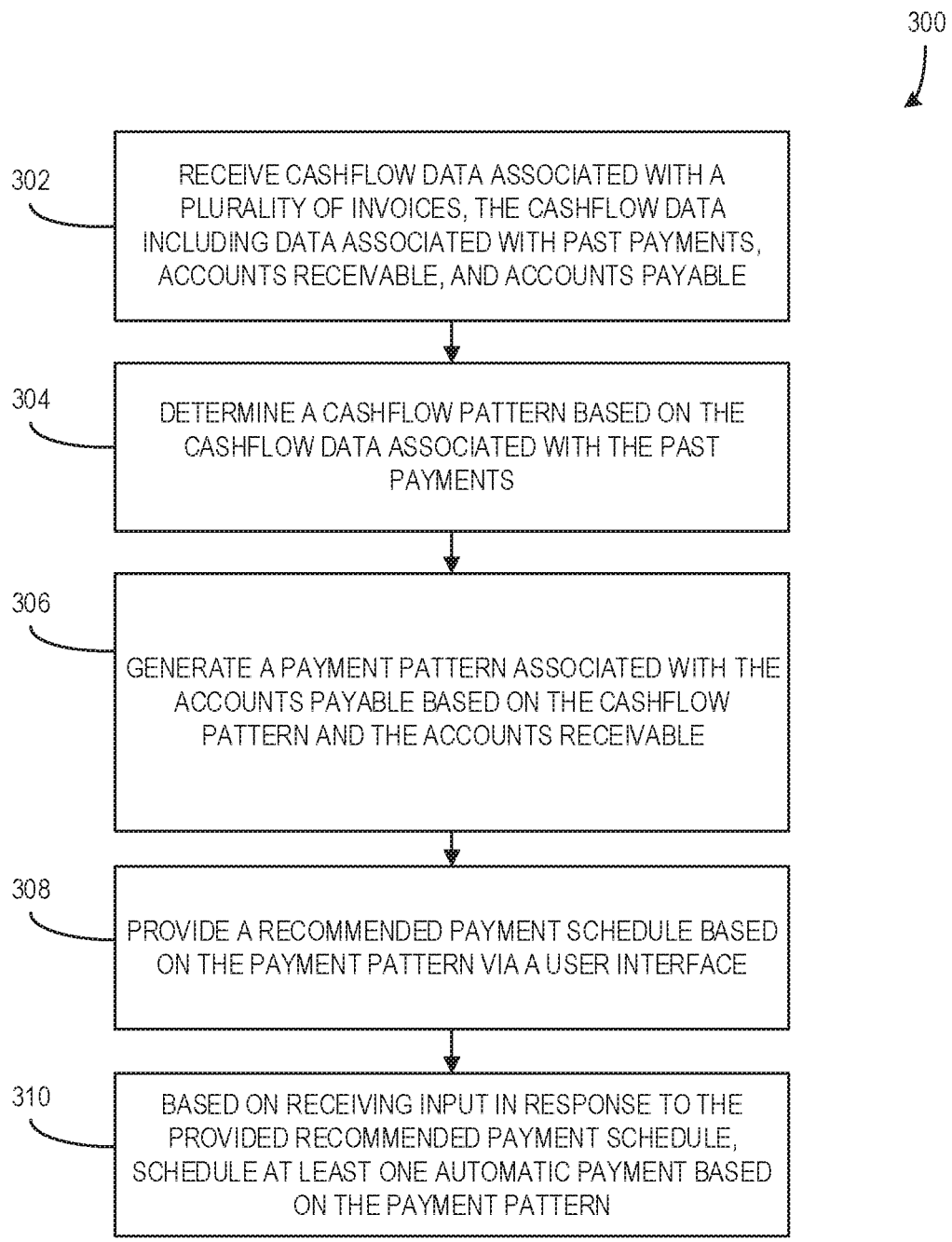
FIG. 3 is a flow chart illustrating a method of managing business payments based on cashflow data according to an embodiment.

FIG. 3 is an exemplary flow chart 300 illustrating a method of managing business payments based on cashflow data according to an embodiment. In some examples, the method of flow chart 300 is implemented and/or executed on a system 100 or 200 as described above. At 302, cashflow data associated with a plurality of invoices is received. The cashflow data includes data associated with past payments, accounts receivable, and accounts payable. In some examples, the cashflow data is received by a payment manager (e.g., payment manager 106) via a cashflow data interface (e.g., cashflow data interface 108). Further, receiving the cashflow data may include scanning, reading, or otherwise collecting data from the plurality of invoices, which include digital invoice files and/or physical invoices, and converting or otherwise formatting the collected data into cashflow data (e.g., cashflow data 110) for storage in a cashflow data store.

At 304, a cashflow pattern is determined based on the cashflow data associated with the past payments. In some examples, the determined cashflow pattern includes an estimated or predicted pattern of payments, transactions, and/or other cashflow events over a future time period. Determining the predicted cashflow events may be based on cashflow pattern generation rules (e.g., cashflow pattern generation rules 238) as described above. In further examples, determining the cashflow pattern includes storing the cashflow pattern and enabling other components (e.g., a payment pattern generator 124, 224) of the payment manager to access the cashflow pattern.

At 306, a payment pattern associated with the accounts payable data is generated based on the cashflow pattern and the accounts receivable. The generated payment pattern indicates a pattern of payments that optimizes a net present value of funds associated with the accounts payable over an associated period. In some examples, the payment pattern is generated based on payment pattern generation rules (e.g., payment pattern generation rules 224) as described herein. Further, generating the payment pattern may include analyzing the accounts payable data to determine what payments are due and when they are due and then comparing that information to the cashflow pattern, which includes predicted payment amounts and dates of incoming payments over the period, and the accounts receivable data, which also includes information about incoming payments that are expected to be received throughout the period. The payment pattern is then generated by creating optimized payment amounts and payment dates such that each payment of the accounts payable data is paid prior to associated due dates and that, when each optimized payment is scheduled, a sufficient amount of cash predicted to be on hand based on the cashflow pattern and the accounts receivable data. Such optimized payment amounts and dates may be generated based on early payment discount data, late payment charge data, service charge data, or other factors as described herein.

At 308, a recommended payment schedule based on the payment pattern is provided via a user interface. In some examples, the recommended payment schedule is displayed to a user or users on a display interface, such as a touchscreen, and the user or users are enabled to provide feedback to the schedule or other input in response to the schedule. Providing the recommended payment schedule may include displaying each optimized payment from the payment pattern as a recommended payment to the user, including an amount to be paid, an entity to be paid, and a date and/or time for the payment to occur. In further examples, the recommended payment schedule includes graphs, diagrams, or other visualizations that provide information associated with the recommended payment schedule to the user in a visual format. For instance, the recommended payment schedule may include a line graph or the like that visually displays changes in the available funds over the period of the payment schedule, such that the graph reflects cashflow events from receiving predicted payments and paying out recommended payments. Alternatively, or additionally, the recommended payment schedule may include alerts or other status information based on defined events occurring, such as the predicted available funds dipping below a defined threshold based on a recommended payment, or a recommended payment occurring after a due date based on a lack of sufficient funds to pay it before the due date. Such event alerts may be provided to a user separately from the other information described herein or in conjunction with it. For instance, an alert for a recommended payment being late may be provided in the form of highlighting that particular payment in a list of the recommended payments, or an alert for the available funds falling below an available fund threshold may be illustrated on the available funds graph described above in the form of a horizontal line across the graph at the available fund threshold, such that the graphed line falling beneath the threshold is readily visible to the user.

At 310, based on receiving input in response to the provided recommended payment schedule, at least one automatic payment is scheduled based on the payment pattern. In some examples, the received input includes accepted payments, adjusted payments, and/or rejected payments from the recommended payment schedule. The accepted payments and/or adjusted payments are scheduled by a payment scheduler component (e.g., payment scheduler 132) or the like. As described above, the scheduled payments may be performed automatically using electronic payment methods or techniques that would be understood by a person of ordinary skill in the art.

Figure 4:
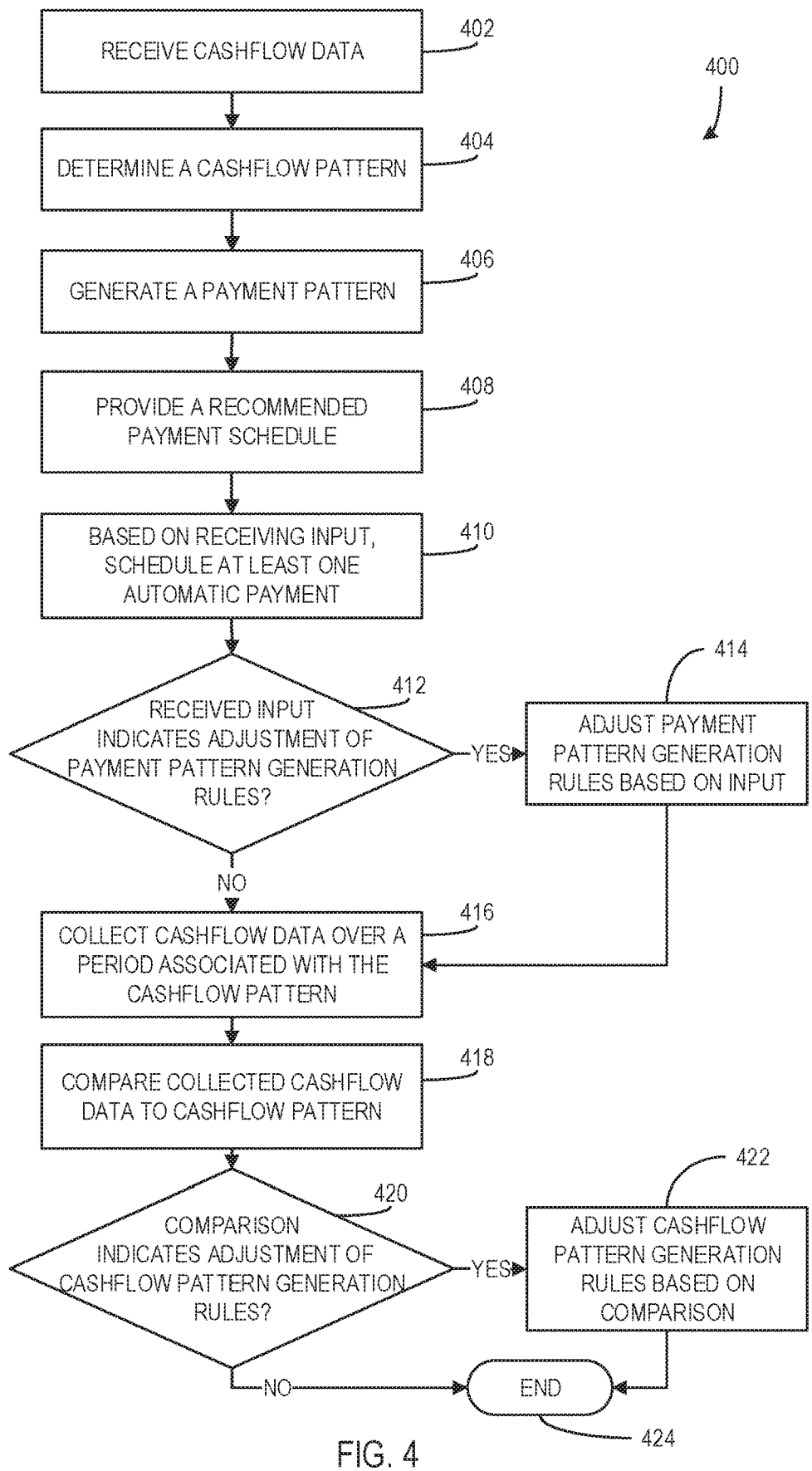
FIG. 4 is a flow chart illustrating a method of managing business payments based on cashflow data and adjusting pattern generation rules based on received feedback according to an embodiment.

FIG. 4 is an exemplary flow chart 400 illustrating a method of managing business payments based on cashflow data and adjusting pattern generation rules based on received feedback according to an embodiment. In some examples, the method of flow chart 400 is implemented and/or executed on a system 100 or 200 as described above. At 402-410, the method of flow chart 400 performs operations that are substantially the same as 302-310 of flow chart 300 in FIG. 3, including receiving cashflow data at 402, determining a cashflow pattern at 404, generating a payment pattern at 406, providing a recommended payment schedule at 408, and scheduling at least one automatic payment based on receiving input at 410.

At 412, if the received input indicates that the payment pattern generation rules (e.g., payment pattern generation rules 240) should be adjusted, the process proceeds to 414. Alternatively, if adjustments of the payment pattern generation rules are not indicated, the process proceeds to 416. Input from a user may indicate adjustment of the rules if the input indicates that the recommended payment schedule and/or the associated payment pattern are inaccurate or otherwise include recommended payments that are not acceptable to the user (e.g., payments that are not on acceptable dates and/or payments that are not of acceptable amounts). In some examples, the input from the user that indicates adjustments to the rules includes the user adjusting or editing one or more recommended payments and/or the user rejecting one or more recommended payments of the schedule. However, in some examples, not all such user input indicates that rules should be adjusted. For instance, if the user provides input that includes changing a recommended payment and the change made to the payment is minor (e.g., the changed payment is within a defined threshold or proximity of the original recommended payment, such as "within 10% of the original recommended payment amount" or "within 2 days of the original recommended payment date"), the input may not indicate that the rules should be adjusted. Alternatively, if the change made exceeds the defined thresholds or proximities of the original recommended payment, the input indicates that the rules associated with generating the original recommended payment should be adjusted in response.

At 414, the payment pattern generation rules are adjusted based on the input. The input may indicate that one or more of the rules associated with generating the changed or rejected payments should be adjusted by defined increments. For instance, rules that are configured to apply defined weights to various types of cashflow data values used in generation of recommended payments may be adjusted by changing the weight values that are applied (e.g., adjusting weights applied to cashflow data values to more heavily weigh more recent data values over less recent data values). Alternatively, or additionally, rules may be adjusted to more heavily or less heavily weigh cashflow data from the current accounts receivable data in comparison to the cashflow pattern in generating payments. Other rule adjustments may also be made without departing from the description, including using machine learning techniques based on the user input as feedback, as described above.

At 416, cashflow data is collected over a period associated with the determined cashflow pattern. The cashflow data collected includes the dates and amounts of payments paid and received and/or details of any other cashflow events that occur over the period. When the period associated with the previously determined cashflow pattern has passed, the collected cashflow data includes the data associated with all of the actual cashflow events that occurred. That collected cashflow data is then compared to the cashflow pattern at 418. In some examples, the comparison includes identifying actual payments in the collected cashflow data that match predicted payments in the cashflow pattern and identifying any differences between them (e.g., differing payment amounts, differing payment dates, etc.).

At 420, if the comparison of the collected cashflow data to the cashflow pattern indicates that adjustments of the cashflow pattern generation rules (e.g., cashflow pattern generation rules 238) should be performed, the process proceeds to 422. Alternatively, if the comparison does not indicate that the rules should be adjusted, the process ends at 424. In some examples, the comparison indicates that the rules should be adjusted when identified differences between the predicted payments and the matching actual payments from the collected cashflow data exceed one or more defined payment difference thresholds. For instance, a payment amount difference threshold may be defined as a 10% difference, such that cashflow pattern generation rule adjustments are indicated when an actual payment amount differs from the predicted payment amount by more than 10%. Other thresholds associated with payment dates, times, or other details associated with the payments may be defined for determining when adjustments of the cashflow pattern generation rules are indicated without departing from the description herein.

At 422, the cashflow pattern generation rules are adjusted based on the comparison of the cashflow pattern to the collected cashflow data. In some examples, the rules that are identified for adjustment are those rules that were used in the determination of predicted payments in the cashflow pattern that substantially differed from the associated actual payments in the comparison (e.g., those payments whose comparisons resulted in the defined payment difference thresholds being exceeded). Adjustments made to the rules may include adjustment of weight values that are applied to the cashflow data used to determine the cashflow pattern (e.g., adjusting weights applied to cashflow data values to more or less heavily weigh more recent data values over less recent data values). Alternatively, or additionally, adjustments may be made to rules that determine confidence values of predicted payments in the cashflow pattern as described above. Other rule adjustments may also be made without departing from the description, including using machine learning techniques based on the comparison of the collected cashflow data to the cashflow pattern as feedback, as described above.

Figure 5:
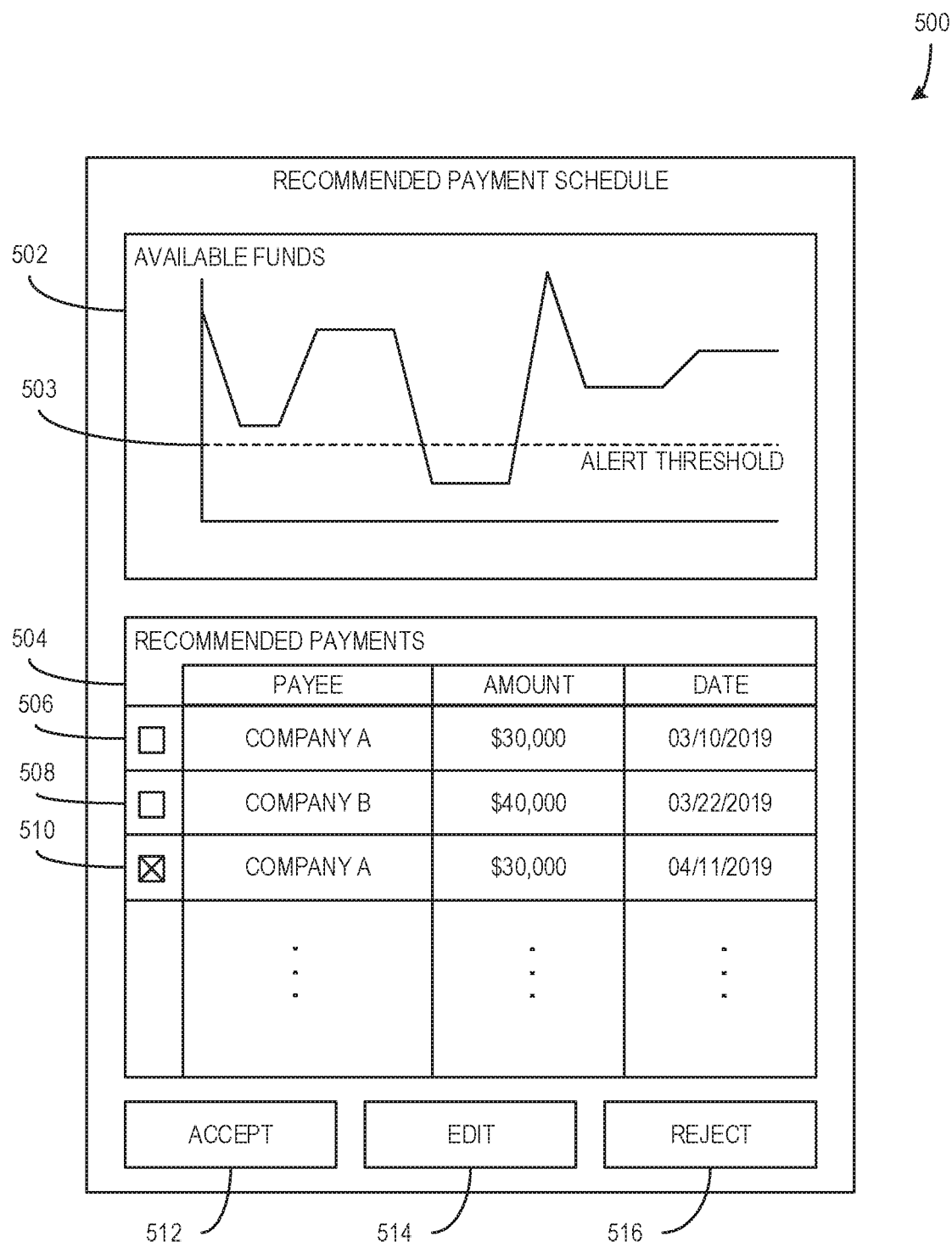
FIG. 5 is an illustration of a graphical user interface configured for providing a user recommended payment schedule information according to an embodiment.

FIG. 5 is an exemplary illustration of a graphical user interface (GUI) 500 configured for providing a user recommended payment schedule information according to an embodiment. It should be understood that, in some examples, the GUI 500 is displayed on a user interface such as user interface 128 and display a recommended payment schedule such as recommended payment schedule 130 in a system such as system 100 as described herein. The GUI includes an available funds graph 502 and a recommended payments list 504. The available funds graph 502 is configured to display the changes in available funds of the company, party, or entity with which the user of the GUI 500 is associated over the period of the recommended payment schedule. The changes of the available funds reflected on the graph 502 are due to cashflow events, including predicted payments received over the period and recommended payments to be paid over the period. The graph 502 further includes an alert threshold 503 that is defined at a particular available fund level on the graph 502, represented by the dotted line as shown. In some examples, the alert threshold is illustrated on the graph 502 to inform a user of times during the period when the available funds are predicted to dip below the threshold 503. Further, the available funds dipping below the threshold 503 may cause the GUI 500 to further notify a user with alerts or other indication (e.g., payments that cause the threshold 503 to be crossed may be highlighted in the recommended payments list 504, a dialog or other visual component may be displayed to draw attention to the alert, etc.).

The recommended payments list 504 displays each of the recommended payments 506, 508, and 510 in rows of the list. Each recommended payment 506-510 is displayed with an associated payee, a payment amount, and a payment date. Further, each row is illustrated with a check box in the left column, enabling the user of the GUI 500 to interact with one or more of the recommended payments 506-510. For instance, a user may select several of the recommended payments 506-510 in the list 504 using the checkboxes and then accept the selected payments by pressing or otherwise interacting with the accept button 512 below the list 504. Similarly, selected payments may be edited or adjusted by pressing or otherwise interacting with the edit button 514 or selected payments may be rejected by pressing or otherwise interacting with the reject button 516.

In some examples, interacting with the buttons 512, 514, and 516 causes the GUI 500 to change and/or other associate GUIs to be displayed that enable the user of the GUI 500 to complete the selected actions. Alternatively, or additionally, more, fewer, or different GUI components may be included in the GUI 500 that are configured to enable users to view and/or interact with the recommended payment schedule without departing from the description herein.

Additional Example Scenarios

Aspects of the disclosure enable various additional scenarios, such as next described.

In an example, a business is using a payment management system as described herein. Users at the business have arranged to have each invoice that is received or created by the business provided to the payment management system via a cashflow data interface. For the most part, the provided invoices are electronic and are uploaded to the payment management system by an application program interface (API) that is part of the cashflow data interface of the payment management system. However, in some cases, the users at the business scan paper invoice documents and provide the resulting image data to the payment management system via the cashflow data interface as well. The cashflow data interface is configured to perform OCR on scanned image data to extract and store the cashflow data.

Periodically, the payment management system generates a recommended payment schedule for outstanding payments that the business owes. The payment management system analyzes the cashflow data of past payments and upcoming payments associated with the current accounts receivable to determine an estimated cashflow pattern over the period of the payment schedule. Then, the system uses the cashflow pattern and other cashflow data to generate a payment pattern that optimizes the use of the business' available funds throughout the payment schedule period. In this case, the payment pattern indicates a pattern of payments that takes advantage of several early payment discounts and avoids all of the potential late payment fees. The generated payment pattern is then presented to a user of the business in the form of the recommended payment schedule via user interface as described herein.

In a further example, the generated payment pattern includes a period where the estimated available funds are insufficient to make all the owed payments on time. The recommended payment schedule provided to the user includes an alert that highlights this period of the schedule and the payments associated therewith. The alert includes information including consequences of late payments for any of the payments (e.g., late payment fees). Further, the user is provided with options regarding which payments to prioritize if some but not all can be paid on time. In some related examples, the alert of the recommended payment schedule includes recommendations for short-term business loans that may be pursued by the business to make up for the shortfall.

Upon the user selecting a payment to prioritize over the others with respect to the above-described shortfall, the payment management system flags the selected payment and the associated payee as high priority for the purpose of scheduling future payments. Later, when a similar situation arises, the recommended payment schedule includes, by default, an on-time payment to the high priority payee at the expense of other payments due to another funding shortfall. The user is still provided with an alert based on the shortfall and enabled to adjust the timing and amounts of payments as desired.

Later, after the period of the recommended payment schedule has passed, the payment management system compares the originally determined cashflow pattern to the actual cashflow data from the period. The comparison reveals that the cashflow pattern was largely accurate, but differences are identified at two points in the period. The recommended payment schedule applies machine learning techniques to cashflow pattern generation rules using the differences between the cashflow pattern and the actual cashflow data as feedback. A portion of the cashflow pattern generation rules are adjusted as a result.

Exemplary Operating Environment

Figure 6:
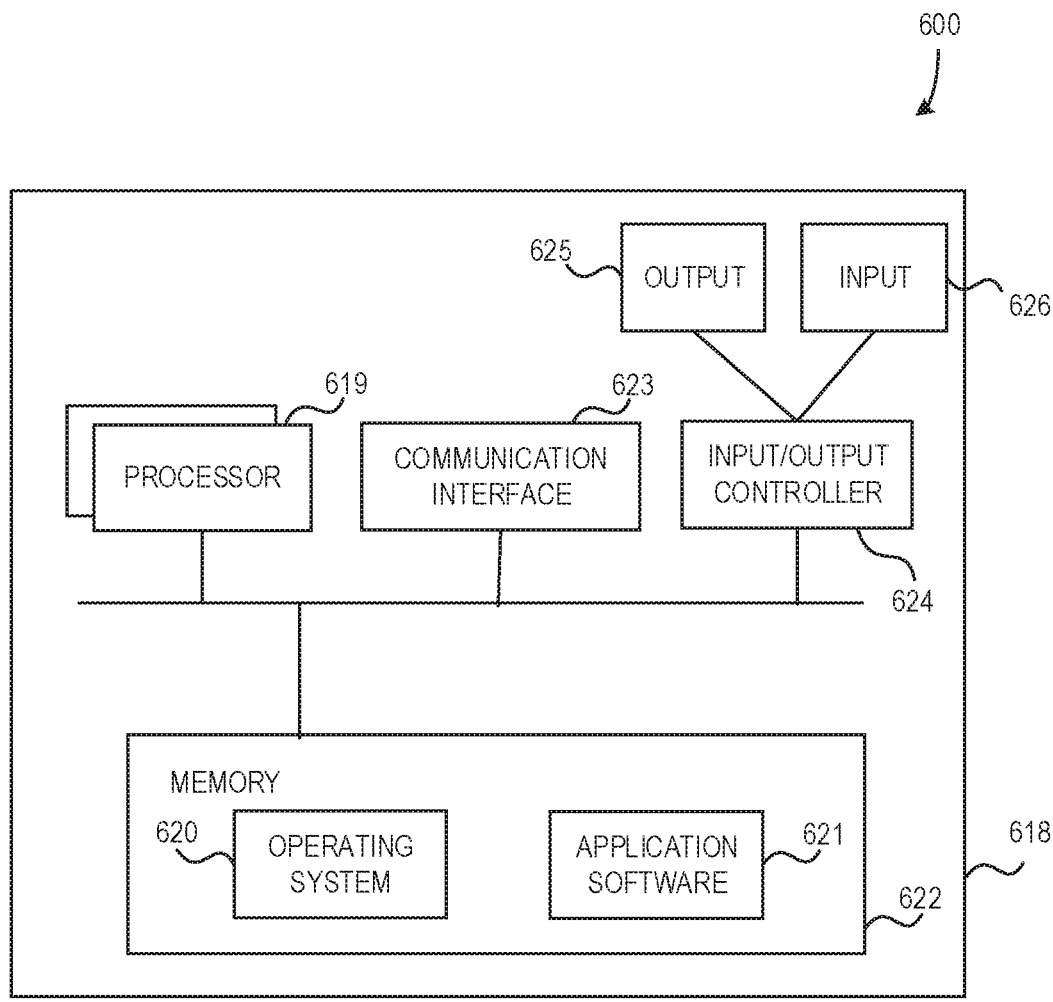
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, providing a recommended payment schedule based on a cashflow pattern and scheduling automatic payments based on the recommended payment schedule as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: receive cashflow data associated with a plurality of invoices, the cashflow data including data associated with a plurality of past paid payments, a plurality of past received payments, a set of accounts receivable, and a set of accounts payable; determine a cashflow pattern based on the cashflow data associated with the plurality of past paid payments and the plurality of past received payments; generate a payment pattern associated with the set of accounts payable based on the cashflow pattern and the set of accounts receivable, wherein the payment pattern indicates a pattern of payments that optimizes a net present value of funds associated with the set of accounts payable over an associated period; provide a recommended payment schedule based on the payment pattern via a user interface; and based on receiving input in response to the provided recommended payment schedule, schedule at least one automatic payment based on the payment pattern.

A computerized method for scheduling an automatic payment based on a recommended payment schedule that is generated based on a cashflow pattern comprises: receiving, by a processor, cashflow data associated with a plurality of invoices, the cashflow data including data associated with a plurality of past paid payments, a plurality of past received payments, a set of accounts receivable, and a set of accounts payable; determining, by the processor, a cashflow pattern based on the cashflow data associated with the plurality of past paid payments and the plurality of past received payments; generating, by the processor, a payment pattern associated with the set of accounts payable based on the cashflow pattern and the set of accounts receivable, wherein the payment pattern indicates a pattern of payments that optimizes a net present value of funds associated with the set of accounts payable over an associated period; providing, by the processor, a recommended payment schedule based on the payment pattern via a user interface; and based on receiving input in response to the provided recommended payment schedule, scheduling, by the processor, at least one automatic payment based on the payment pattern.

One or more exemplary non-transitory computer readable storage media comprises computer-executable instructions for scheduling an automatic payment based on a recommended payment schedule that is generated based on a cashflow pattern that, upon execution by a processor, cause the processor to at least: receive cashflow data associated with a plurality of invoices, the cashflow data including data associated with a plurality of past paid payments, a plurality of past received payments, a set of accounts receivable, and a set of accounts payable; determine a cashflow pattern based on the cashflow data associated with the plurality of past paid payments and the plurality of past received payments; generate a payment pattern associated with the set of accounts payable based on the cashflow pattern and the set of accounts receivable, wherein the payment pattern indicates a pattern of payments that optimizes a net present value of funds associated with the set of accounts payable over an associated period; provide a recommended payment schedule based on the payment pattern via a user interface; and based on receiving input in response to the provided recommended payment schedule, schedule at least one automatic payment based on the payment pattern.

Alternatively, or in addition to the other examples described herein, examples include any combination of the following:

- wherein determining a cashflow pattern is based on at least one cashflow pattern generation rule; and further comprising storing the determined cashflow pattern; recording cashflow transactions over a period associated with the stored cashflow pattern; comparing the cashflow pattern to the recorded cashflow transactions; and adjusting the at least one cashflow pattern generation rule based on the comparison of the cashflow pattern to the recorded cashflow transactions indicating at least one payment difference.
- wherein generating a payment pattern is based on at least one payment pattern generation rule; and further comprising adjusting the at least one payment pattern generation rule based on the input received in response to the recommended payment schedule.
- wherein the cashflow data of the set of accounts payable includes at least one of early payment discount data, late payment charge data, service charge data, or interest rate data; and wherein generating the payment pattern is further based on at least one of the early payment discount data, the late payment charge data, the service charge data, or the interest rate data.
- wherein the received cashflow data is associated with a plurality of entities, wherein each entity of the plurality of entities is associated with at least one payment represented in the received cashflow data as a payer or payee of the at least one payment; wherein determining a cashflow pattern includes determining an entity-specific cashflow pattern for each entity of the plurality of entities based on the cashflow data associated with the entity; wherein generating a payment pattern includes generating an entity-specific payment pattern for each entity of the plurality of entities based on the determined cashflow pattern specific to the entity; and wherein providing a recommended payment schedule based on the payment pattern via a user interface includes providing an entity-specific recommended payment schedule for each entity of the plurality of entities based on the generated payment pattern associated with the entity via a user interface associated with the entity.
- further comprising: generating a cashflow alert based on the cashflow pattern indicating a reduction of an available funds value to a value that is less than an available fund threshold over the period of the cashflow pattern; and including the generated cashflow alert in the provided recommended payment schedule via the user interface.
- wherein the input received in response to the provided recommended payment schedule includes acceptance of a first recommended payment of the recommended payment schedule and rejection of a second recommended payment of the recommended payment schedule; and wherein scheduling at least one automatic payment based on the payment pattern includes scheduling the first recommended payment and not scheduling the second recommended payment.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving cashflow data associated with a plurality of invoices, the cashflow data including data associated with a plurality of past paid payments, a plurality of past received payments, a set of accounts receivable, and a set of accounts payable; exemplary means for determining a cashflow pattern based on the cashflow data associated with the plurality of past paid payments and the plurality of past received payments; exemplary means for generating a payment pattern associated with the set of accounts payable based on the cashflow pattern and the set of accounts receivable, wherein the payment pattern indicates a pattern of payments that optimizes a net present value of funds associated with the set of accounts payable over an associated period; exemplary means for providing a recommended payment schedule based on the payment pattern via a user interface; and exemplary means for scheduling, based on receiving input in response to the provided recommended payment schedule, at least one automatic payment based on the payment pattern.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for scheduling an automatic payment based on a recommended payment schedule that is generated based on a cashflow pattern, the system comprising:
   at least one processor; and
   at least one memory comprising computer program code, the at least one memory and the computer program code configured to, with the at least one processor, cause the at least one processor to:
      receive cashflow data associated with a plurality of invoices, the cashflow data including data associated with a plurality of past paid payments, a plurality of past received payments, a set of accounts receivable, and a set of accounts payable;
      determine a cashflow pattern based on the cashflow data associated with the plurality of past paid payments and the plurality of past received payments;
      apply one or more payment pattern generation rules to the cashflow pattern and the set of accounts receivable to generate a payment pattern associated with the set of accounts payable, wherein the payment pattern indicates a pattern of payments that optimizes a net present value of funds associated with the set of accounts payable over an associated period;
      provide a recommended payment schedule based on the payment pattern via a user interface displayed on a display device;
      based on receiving input in response to the provided recommended payment schedule, schedule at least one automatic payment based on the payment pattern; and
      generate a set of differences between the determined cashflow pattern and actual cashflow data obtained based on the automatic payment, and automatically apply the generated set as feedback to train a machine learning component causing the trained machine learning component to adjust the one or more payment pattern generation rules, the adjustment comprising adjusting weights applied to the cashflow data to weigh a first set of the cashflow data differently from a second set of the cashflow data.

2. The system of claim 1, wherein the user interface displays an available funds graph over a period of the recommended payment schedule and an alert threshold informing a user of times when available funds are predicted to dip below the alert threshold based on following the recommended payment schedule, and wherein the user interface allows the user to edit one or more recommended payments displayed on the user interface to maintain the available funds above the alert threshold.

3. The system of claim 1, wherein generating the payment pattern is based on at least one payment pattern generation rule; and
   the at least one memory and the computer program code configured to, with the at least one processor, further cause the at least one processor to:
   adjust the at least one payment pattern generation rule based on the input received in response to the recommended payment schedule.

4. The system of claim 1, wherein a plurality of stored training data pairs comprising a timestamp-based feedback data value paired with an interval adjustment value, is used to train the machine learning component.

5. The system of claim 1, wherein the received cashflow data is associated with a plurality of entities, wherein each entity of the plurality of entities is associated with at least one payment represented in the received cashflow data as a payer or payee of the at least one payment;
   wherein determining the cashflow pattern includes determining an entity-specific cashflow pattern for each entity of the plurality of entities based on the cashflow data associated with the entity;
   wherein generating the payment pattern includes generating an entity-specific payment pattern for each entity of the plurality of entities based on the determined cashflow pattern specific to the entity; and
   wherein providing the recommended payment schedule based on the payment pattern via a user interface includes providing an entity-specific recommended payment schedule for each entity of the plurality of entities based on the generated payment pattern associated with the entity via a user interface associated with the entity.

6. The system of claim 1, wherein the at least one memory and the computer program code is configured to, with the at least one processor, further cause the at least one processor to:
   generate a cashflow alert based on the cashflow pattern indicating a reduction of an available funds value to a value that is less than an available fund threshold over a period of the cashflow pattern; and
   include the generated cashflow alert in the provided recommended payment schedule via the user interface.

7. The system of claim 1, wherein the input received in response to the provided recommended payment schedule includes acceptance of a first recommended payment of the recommended payment schedule and rejection of a second recommended payment of the recommended payment schedule; and
   wherein scheduling the at least one automatic payment based on the payment pattern includes scheduling the first recommended payment and not scheduling the second recommended payment.

8. A computerized method for scheduling an automatic payment based on a recommended payment schedule that is generated based on a cashflow pattern, the method comprising:
   receiving, by a processor, cashflow data associated with a plurality of invoices, the cashflow data including data associated with a plurality of past paid payments, a plurality of past received payments, a set of accounts receivable, and a set of accounts payable;

determining, by the processor, a cashflow pattern based on the cashflow data associated with the plurality of past paid payments and the plurality of past received payments;

applying, by the processor, one or more payment pattern generation rules to the cashflow pattern and the set of accounts receivable to generate a payment pattern associated with the set of accounts payable, wherein the payment pattern indicates a pattern of payments that optimizes a net present value of funds associated with the set of accounts payable over an associated period;

providing, by the processor, a recommended payment schedule based on the payment pattern via a user interface displayed on a display device;

based on receiving input in response to the provided recommended payment schedule, scheduling, by the processor, at least one automatic payment based on the payment pattern; and generating a set of differences between the determined cashflow pattern and actual cashflow data obtained based on the automatic payment, and automatically applying the generated set as feedback to train a machine learning component causing the trained machine learning component to adjust the one or more payment pattern generation rules, the adjustment comprising adjusting weights applied to the cashflow data to weigh a first set of the cashflow data differently from a second set of the cashflow data.

9. The computerized method of claim 8, wherein the user interface displays an available funds graph over a period of the recommended payment schedule and an alert threshold informing a user of times when available funds are predicted to dip below the alert threshold based on following the recommended payment schedule, and wherein the user interface allows the user to edit one or more recommended payments displayed on the user interface to maintain the available funds above the alert threshold.

10. The computerized method of claim 8, wherein a plurality of stored training data pairs comprising a timestamp-based feedback data value paired with an interval adjustment value, is used to train the machine learning component.

11. The computerized method of claim 8, wherein the cashflow data of the set of accounts payable includes at least one of early payment discount data, late payment charge data, service charge data, or interest rate data; and wherein generating the payment pattern is further based on at least one of the early payment discount data, the late payment charge data, the service charge data, or the interest rate data.

12. The computerized method of claim 8, wherein the received cashflow data is associated with a plurality of entities, wherein each entity of the plurality of entities is associated with at least one payment represented in the received cashflow data as a payer or payee of the at least one payment;

wherein determining the cashflow pattern includes determining an entity-specific cashflow pattern for each entity of the plurality of entities based on the cashflow data associated with the entity;

wherein generating the payment pattern includes generating an entity-specific payment pattern for each entity of the plurality of entities based on the determined cashflow pattern specific to the entity; and wherein providing the recommended payment schedule based on the payment pattern via a user interface includes providing an entity-specific recommended payment schedule for each entity of the plurality of entities based on the generated payment pattern associated with the entity via a user interface associated with the entity.

13. The computerized method of claim 8, further comprising:

generating a cashflow alert based on the cashflow pattern indicating a reduction of an available funds value to a value that is less than an available fund threshold over a period of the cashflow pattern; and including the generated cashflow alert in the provided recommended payment schedule via the user interface.

14. The computerized method of claim 8, wherein the input received in response to the provided recommended payment schedule includes acceptance of a first recommended payment of the recommended payment schedule and rejection of a second recommended payment of the recommended payment schedule; and wherein scheduling the at least one automatic payment based on the payment pattern includes scheduling the first recommended payment and not scheduling the second recommended payment.

15. One or more non-transitory computer readable storage media having computer-executable instructions for scheduling an automatic payment based on a recommended payment schedule that is generated based on a cashflow pattern that, upon execution by a processor, cause the processor to at least:

receive cashflow data associated with a plurality of invoices, the cashflow data including data associated with a plurality of past paid payments, a plurality of past received payments, a set of accounts receivable, and a set of accounts payable;

determine a cashflow pattern based on the cashflow data associated with the plurality of past paid payments and the plurality of past received payments;

apply one or more payment pattern generation rules to the cashflow pattern and the set of accounts receivable to generate a payment pattern associated with the set of accounts payable, wherein the payment pattern indicates a pattern of payments that optimizes a net present value of funds associated with the set of accounts payable over an associated period;

provide a recommended payment schedule based on the payment pattern via a user interface displayed on a display device;

based on receiving input in response to the provided recommended payment schedule, schedule at least one automatic payment based on the payment pattern; and generate a set of differences between the determined cashflow pattern and actual cashflow data obtained based on the automatic payment, and automatically apply the generated set as feedback to train a machine learning component causing the trained machine learning component to adjust the one or more payment pattern generation rules, the adjustment comprising adjusting weights applied to the cashflow data to weigh a first set of the cashflow data differently from a second set of the cashflow data.

16. The one or more non-transitory computer readable storage media of claim 15, wherein the user interface displays an available funds graph over a period of the recommended payment schedule and an alert threshold informing a user of times when available funds are predicted to dip below the alert threshold based on following the recommended payment schedule, and wherein the user interface allows the user to edit one or more recommended payments displayed on the user interface to maintain the available funds above the alert threshold.

17. The one or more non-transitory computer readable storage media of claim 15, wherein generating the payment pattern is based on at least one payment pattern generation rule; and
  wherein the computer-executable instructions, upon execution by a processor,
  further cause the at least one processor to:
  adjust the at least one payment pattern generation rule based on the input received in response to the recommended payment schedule.

18. The one or more non-transitory computer readable storage media of claim 15, wherein a plurality of stored training data pairs comprising a timestamp-based feedback data value paired with an interval adjustment value, is used to train the machine learning component.

19. The one or more non-transitory computer readable storage media of claim 15, wherein the received cashflow data is associated with a plurality of entities, wherein each entity of the plurality of entities is associated with at least one payment represented in the received cashflow data as a payer or payee of the at least one payment;
  wherein determining the cashflow pattern includes determining an entity-specific cashflow pattern for each entity of the plurality of entities based on the cashflow data associated with the entity;
  wherein generating the payment pattern includes generating an entity-specific payment pattern for each entity of the plurality of entities based on the determined cashflow pattern specific to the entity; and
  wherein providing the recommended payment schedule based on the payment pattern via a user interface includes providing an entity-specific recommended payment schedule for each entity of the plurality of entities based on the generated payment pattern associated with the entity via a user interface associated with the entity.

20. The one or more non-transitory computer readable storage media of claim 15, wherein the computer-executable instructions, upon execution by a processor, further cause the at least one processor to:
  generate a cashflow alert based on the cashflow pattern indicating a reduction of an available funds value to a value that is less than an available fund threshold over a period of the cashflow pattern; and
  include the generated cashflow alert in the provided recommended payment schedule via the user interface.

* * * * *